United States Patent [19]
Godard et al.

[11] 3,882,418
[45] May 6, 1975

[54] PARALLEL PLATE TRANSMISSION LINE LASER EXCITATION SYSTEM
[75] Inventors: Bruno Godard, Gif-sur-Yvette;
Bernard Lacour,
Villebon-sur-Yvette, Palaiseau, both of France
[73] Assignee: Compagnie Generale d'Electricite, Paris, France
[22] Filed: June 21, 1974
[21] Appl. No.: 481,725

[30] Foreign Application Priority Data
June 22, 1973   France ............................... 73.22972

[52] U.S. Cl. ........ 331/94.5 G; 331/94.5 PE; 333/17; 333/84 R
[51] Int. Cl. ........................... H01s 3/09; H01s 3/22
[58] Field of Search ....... 331/94.5; 330/4.3; 333/11, 333/17, 84, 21, 31; 343/781, 783, 785

[56] References Cited
OTHER PUBLICATIONS
Waynant, IEEE J. Quantum Electronics, QE–7, 1971, p. 282.
Waynant, Applied Physics Letters, 22, (8), 15, April, 1973, pp. 419–20 QC 1 A7

*Primary Examiner*—Robert J. Webster
*Attorney, Agent, or Firm*—Sughrue, Rothwell, Mion, Zinn & Mackpeak

[57] ABSTRACT

A gas laser generator comprising an excitation line formed by an insulating plate inserted between two metallic plates, one of whose edges is in the shape of a parabola, one of the metallic plates having a slot enclosing an active gaseous medium, an excitation circuit for setting up a discharge between the plates at the level of the focus of the parabola; the insulating plate and the metallic plate containing the slot form, in the immediate vicinity of the slot a projecting part defining a cavity through which passes a current of fluid whose dielectric rigidity is adjusted so that any overvoltage induced in the line, at the time of the operation of the excitation circuit, causes a second discharge between the metallic plates exclusively through the fluid flowing in the cavity.

8 Claims, 1 Drawing Figure

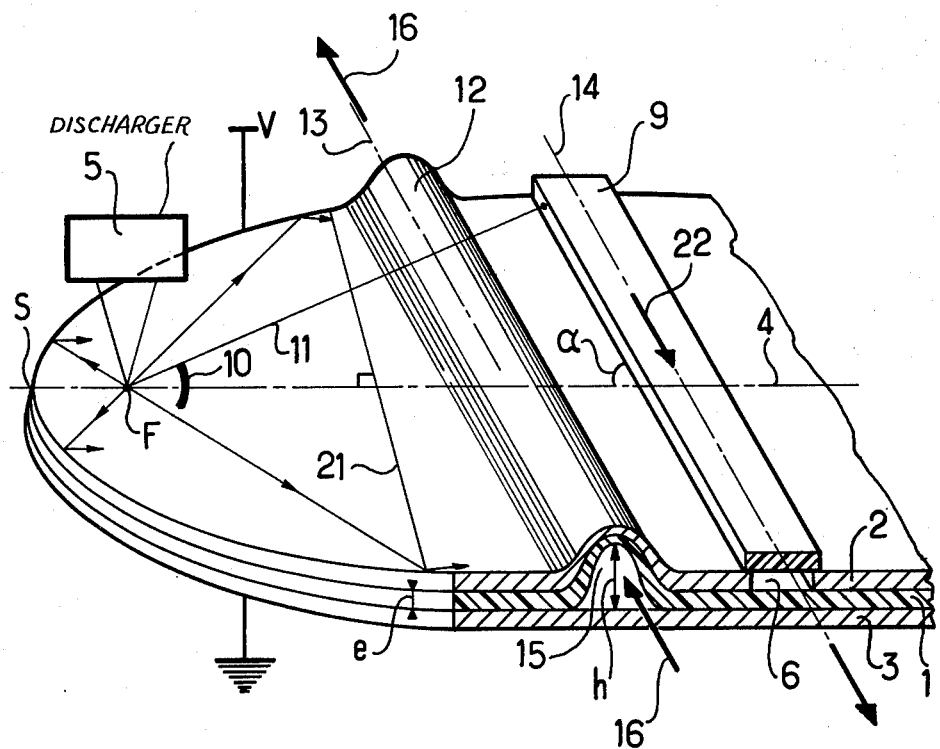

PARALLEL PLATE TRANSMISSION LINE LASER EXCITATION SYSTEM

BACKGROUND OF THE INVENTION

1. Field of the Invention:

The present invention concerns gas lasers in which a stimulated emission is obtained subsequent to an electrical discharge in an active gaseous medium.

2. Description of the Prior Art:

Gas lasers comprising a longitudinal cavity containing an active gas and in which the electrical discharge is obtained by means of a progressive current wave propagating in the active medium from one end to the other of the cavity with a speed equal to that of the propagation of a light emission stimulated in that cavity, are known.

Such gas lasers comprise a flat electric line, consisting of an insulating plate inserted between a first metallic plate and a second metallic plate brought to different potentials, and excitation means for generating a discharge wave in that line.

The active gaseous medium is arranged in a longitudinal slot provided in one of the metallic plates of the line, in the path of the discharge wave.

To great advantage, the edges of each of the plates are in the shape of a parabola whose axis forms an angle $\alpha$ greater than zero with the axis of the slot.

Moreover, the progressive current wave is generated by means of a release circuit suitable for setting up a substantially punctiform discharge between the said metallic plates at the level of the focusses of the parabolas.

Nevertheless, it is more particularly observed that in such lasers energy is badly distributed along the slot, thus sometimes causing substantial disturbances in the light transmission.

Moreover, the discharge wave frequently generates in the excitation line over-voltages, causing hazardous discharges in the said line, and which are detrimental to the operation of the laser.

SUMMARY OF THE INVENTION

The present invention makes it possible to overcome such disadvantages and it has for its object a gas laser generator making it possible to obtain a homogenous light emission having great power, while having a simple structure combined with high reliability.

The invention has for its aim a laser generator comprising: an active gaseous medium; an electric excitation line formed by an insulating plate inserted between a first metallic plate and a second metallic plate, an edge of the said plates being formed in the shape of a parabola, the foci as well as the apices of the parabolas being respectively arranged on the same straight line perpendicular to the plane of the plates, the metallic plates being parallel to one another and connected to a voltage source, the first metallic plate having at least one slot separating it into two distinct parts, the common axis of the parabolas forming an angle of greater than zero with the slot; means for maintaining an active gaseous medium in the said slot, comprising a longitudinal blade closing the slot and fixed to the said two parts of the first metallic plates; and means for generating a current wave in the said line, comprising a release circuit for setting up a substantially punctiform discharge between the said metallic plates at the level of the foci of the parabolas; characterized by the improvement wherein: in the immediate vicinity of the slot and on the side of the release circuit, the insulating plate, as well as the first metallic plate, forms a projecting part so that a cavity having an axis substantially parallel to the axis of the slot is formed between the insulating plate and the second metallic plate; and there flows through the cavity a current of at least one fluid having dielectric rigidity whose value is, on the one hand, less than the value of the dielectric rigidity of the insulant forming the insulating plate, and, on the other hand, adjusted in such a way that any over-voltage, induced in the electric excitation line at the time of the setting up of a first discharge between the metallic plates at the level of the foci of the parabolas, causes a second discharge between the metallic plates exclusively through the fluid flowing in the cavity.

Other characteristics and advantages of the invention become apparent from the following description, given by way of a purely illustrating example having no limiting character, with reference to the accompanying figure.

BRIEF DESCRIPTION OF THE DRAWING

The accompanying FIGURE therefore illustrates a laser generator comprising an electric excitation line constituted by an insulating plate 1 arranged between a first metallic plate 2 and a second metallic plate 3 brought to different potentials.

DESCRIPTION OF THE PREFERRED EMBODIMENT

These plates are cut away at one of their ends in the form of parabolas having an axis 4, foci F and apices S, arranged respectively on straight lines perpendicular to the plane of the plates.

The laser comprises means for generating a substantially punctiform electrical discharge at the level of the foci F of the parabolas. These excitation means are constituted for example by a discharger diagrammatically shown at 5, making it possible to set up a difference in potential V between the plates 2 and 3, as diagrammatically shown in the FIGURE.

The rising time of the discharge wave front is, to great advantage, less than twice the propagation time of a discharge wave in the flat line between the foci F and apices S of the parabolas (that time is, for example, on the order of a nanosecond).

The plate 2 has a slot or recess 6 separating it into two distinct parts in which an active laser medium is maintained.

In the case of air at atmospheric pressure, it is not necessary to close the gas recess. Otherwise, the gaseous medium may be enclosed by means of an insulating blade 9 arranged facing the slot 6 and fixed by cementing, for example, to the two edges of that slot. The ends of the gas recess are closed by two windows in a known manner.

The angle $\alpha$ is chosen so that cosine $\alpha$ be equal to the ratio between the propagation speed of a discharge wave in the line in the direction defined by the axis 4 and the speed of propagation of a light emission in the direction of the slot 6.

A reflector 10 constituted, for example, by a drilling in the plate 2, in the shape of an arc of a circle centered on the point F, is arranged on the opposite side of the focus F from apex S. Its transversal dimensions are limited substantially by two straight lines joining the point F to the end points of the slot 6; for example, one straight line 11 is shown.

According to the invention, the insulating plate 1 and the first metallic plate 2 form a projecting part 12 whose axis is substantially parallel to the axis 14 of the slot 6 in such a way that a cavity 15, whose height is $h$, is thus defined between the insulating plate 1 and the second metallic plate 3. Such a cavity may either have both its ends closed by any suitable means to enclose a fluid, or, better, have a fluid current, shown by the arrows 16, flowing through it.

The height $h$ is predetermined as a function of the specific inducing powers of the fluid and of the insulating material used for forming the plate 1, so as not to set up any discontinuity in impedance. Substantially, the height $h$ is equal to the product of the thickness $e$ of the plate 1 and the ratio between the specific inducing powers of the fluid and of the insulating material of the plate 1.

Moreover, the dielectric rigidity of the fluid flowing through the cavity 15 is less than the rigidity of the material of the insulating plate 1 and is adjusted in such a way that when a discharge whose potential is V is set up at the level of the foci F by means of the discharger 5 to cause overvoltages $\Delta V$ in the excitation line, the total voltage $V + \Delta V$ causes a secondary discharge exclusively between the apex of the protruding part 12 and the plate 3, this being effected through the fluid flowing in the cavity 15 and not between the plates 2 and 3 through the insulating plate 1. In other words, in this way, a "weak point" is produced to eliminate any random discharge within the excitation line.

The operation of the laser generator as a whole is therefore as follows:

At a given instant, the discharger 5 sends out a discharge V at the level of the foci F of the parabolas; the discharge wave thus generated has a radial symmetry in relation to the foci F, the fraction of the discharge wave surface comprised within the angle defined by the straight line 11 and its counterpart being reflected by the reflector 10.

All the waves sent out at the level of the foci F are therefore directed towards the parabolas and are reflected at their periphery; it is known that a parabola is perfectly stigmatic for two conjugate points: its focus F and infinity. The wave surface coming from F and reflected by the parabolas is therefore a perfectly plane wave surface perpendicular to the axis of the parabolas and represented by its trace 21.

The progressive discharge wave 21 therefore reaches successively in the direction of the arrow 22 the atoms or the molecules of the active gas. The stimulated light emission is therefore effected from one end to the other of the slot in the direction of the arrow 22 at the same speed as the progressive wave 21 in the direction of that slot. That condition makes it possible to obtain a coherent laser radiation which is very powerful at the output of the slot 6.

Moreover, as previously stated, the over-voltage $\Delta V$ taking place in the excitation line causes a secondary discharge having an amplitude of $V + \Delta V$ between the apex of the protruding part 12 and the plate 3, through the fluid flowing in the cavity 15. Such a secondary discharge insures, moreover, a better distribution of the excitation of the active medium enclosed in the slot 6.

It should be observed, moreover, that the fluid current set up in the cavity 15 makes it possible to remove continuously the decomposition products resulting from such a discharge.

We have actually made a laser generator in which the metallic plates 2 and 3 are made of copper and have a thickness of $35\mu$, whereas the insulating plate 1 made of "Mylar" has a thickness of $75\mu$ and a specific inducing power (dielectric constant) of 3 for a dielectric rigidity or strength of 280 Kv/mm. Moreover, the cavity 15 has a height on the order of 2 mm, and flowing through the cavity is a current of water having a specific inducing power in the order of 80, and whose dielectric rigidity has been adjusted by partial deionization so that the secondary discharge may occur for an over-voltage $\Delta V$ between a very low value and a value V equal to the voltage at the terminals of the discharger 5, this being a total voltage of about 2V.

It must be understood that the invention is in no way limited to the embodiment described and illustrated, which has been given by way of an example. More particularly, without going beyond the scope of the invention, details may be modified, certain arrangements may be changed or certain means may be replaced by equivalent means.

We claim:

1. In a laser generator including: an active gaseous medium; an electric excitation line formed by an insulating plate inserted between a first metallic plate and a second metallic plate, an edge of the said plates being formed in the shape of a parabola, the foci as well as the apices of the parabolas being respectively arranged on the same straight line perpendicular to the plane of the plates, the metallic plates being parallel to one another and connected to a voltage source, the first metallic plate having at least one slot separating it into two distinct parts, the common axis of the parabolas forming an angle$\alpha$ greater than zero with the slot; means for maintaining an active gaseous medium in the said slot, comprising a longitudinal blade closing the slot and fixed to the said two parts of the first metallic plate; and means for generating a current wave in the said line, comprising a release circuit for setting up a substantially punctiform discharge between the said metallic plates at the level of the foci of the parabolas; and comprising the improvement wherein: in the immediate vicinity of said slot (6) and on the side of said release circuit (5), said insulating plate (1) as well as said first metallic plate (2) form a projecting part (12) so that a cavity (15) having an axis (13) substantially parallel to the axis (4) of the slot(6) is formed between the insulating plate (1) and said second metallic plate (3); and said cavity (15) contains at least one fluid having a dielectric rigidity whose value is, on the one hand, less than the value of the dielectric rigidity of the insulating material forming said insulating plate (1) and, on the other hand, adjusted in such a way that any over-voltage induced in the electric excitation line at the time of the setting up of a first discharge between between the metallic plates (2, 3) at the level of the foci (F) of the parabolas causes a second discharge between the said metallic plates (2, 3) exclusively through the fluid in the said cavity (15).

2. The improvement according to claim 1 wherein the height ($h$) of said cavity (15) is substantially equal to the product of the thickness ($e$) of the said insulating plate (1) by the ratio between the values of the specific inducing powers of said fluid and of said insulating material.

3. The improvement according to claim 1 wherein said fluid is constituted at least in part by water.

4. The improvement according to claim 3 wherein the value of the dielectric rigidity of the fluid is adjusted by regulating the proportion of impurities in the water.

5. The improvement according to claim 1 wherein the recess defined by said slot (6) and said insulating plate 1 is closed at its ends by two insulating windows transparent to an emission radiation of the said gaseous medium.

6. The improvement according to claim 1 wherein said angle $\alpha$ is such that cosine $\alpha$ is equal to the ratio between the propagation speed of said current wave along the axis (4) of said parabolas and the propagation speed of said emission radiation of said gaseous medium in the direction of the said slot (6).

7. The improvement according to claim 1 wherein at least the said first metallic plate (2) comprises a wave reflector (10) constituted by a drilling limited by an arc of a circle substantially centered on said focus (F), the apices (S) of said parabolas and said arc of said circle being arranged on opposite sides of said focus (F).

8. The improvement according to claim 1 wherein said fluid flows continuously through said cavity.

* * * * *